April 5, 1932.  O. MITCHELL  1,852,851
SAW BAND
Filed April 27, 1931
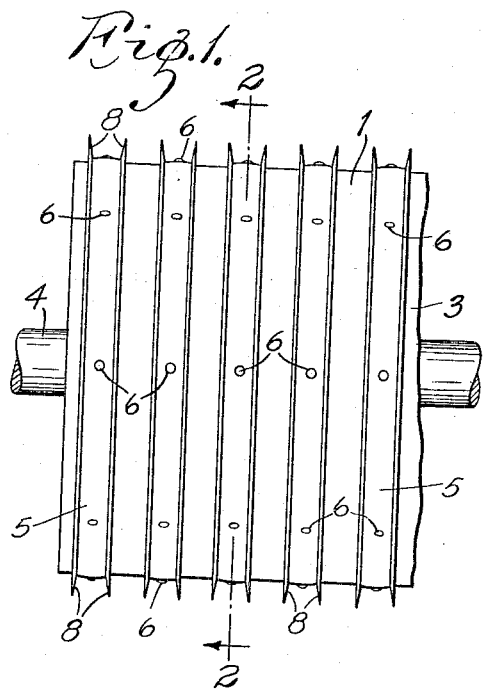
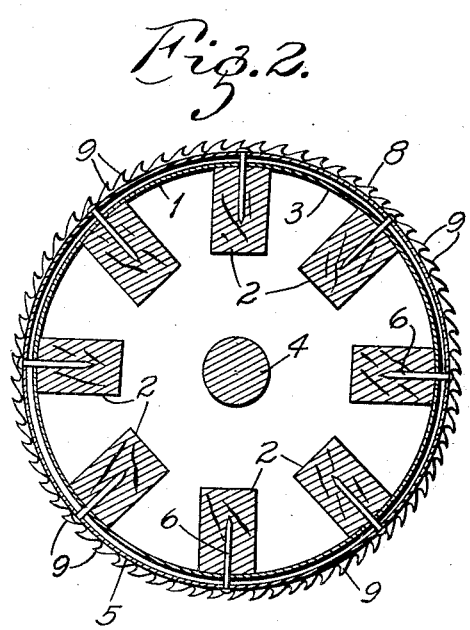
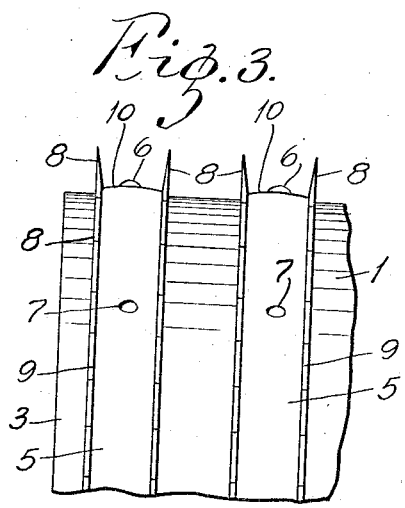
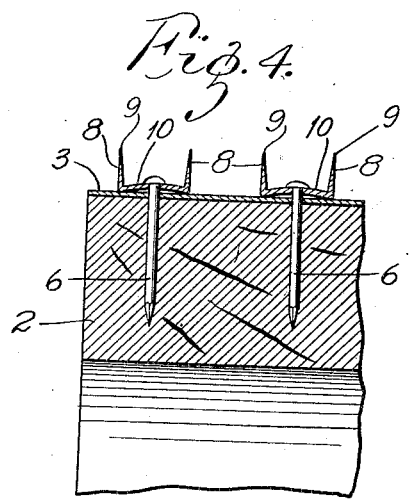
INVENTOR:
ORVILLE MITCHELL
BY
ATTORNEY.

Patented Apr. 5, 1932

1,852,851

UNITED STATES PATENT OFFICE

ORVILLE MITCHELL, OF DALLAS, TEXAS

SAW BAND

Application filed April 27, 1931. Serial No. 533,134.

This invention relates to a novel saw band construction for use in cotton extracting and cleaning machines.

Saw bands as usually constructed for this purpose are made from strips of steel the side edges of which are bent out at right angles to form flanges, and saw teeth are then cut in these flanges. These bands are then placed at regular intervals around the surface of a drum and nailed or screwed thereto through equally spaced apertures provided in the band throughout its length. In this manner saw cylinders of any desired size, such as are used in extracting the cotton from a mixture of cotton, hulls and trash, are formed, each saw band providing two rows of teeth extending around the drum.

Heretofore, the body of the saw band, or that portion between the two flanges in which the saw teeth are cut, has been made flat. Experience has shown this form of construction to be objectionable, in that the edges of the band directly beneath the flanges do not lay flat on the drum; in fact, when the bands are nailed to the drum the edges tend to curl up unevenly, which not only permits sand, trash and other foreign matter to accumulate or wedge between the bands and drum, but causes the points of the teeth to lie at unequal distances from the surface of the drum. In other words, when gauged at the points of the teeth, it is found impossible to assemble a true saw cylinder when bands are employed that are flat between the toothed flanges.

I have found that the above difficulties are obviated by forming each band with a slight concave on its inner surface, or that next to the drum to which it is secured. The nails securing the saw bands to the drum are driven through perforations from the convex side of the bands, and press the inner or concave side thereof securely against the drum, so that the outer edges, or those portions of the bands directly under the two flanges, are pressed firmly against the drum. Furthermore, the natural spring of the metal causes the edges of the bands to be constantly pressed against the surface of the drum, and there is therefore no tendency for these edge portions to curl upward.

My invention, therefore, consists in forming a saw band for cotton cleaning machines with the body portion lying between the two saw toothed flanges concaved on its under side.

The invention is illustrated in the accompanying drawings in which—

Figure 1 is a view in front elevation of a portion of a saw cylinder having saw bands of my invention secured around its outer surface.

Figure 2 is a section on the line 2—2 of Figure 1.

Figure 3 is an enlarged broken detail view, showing, particularly, the manner in which the saw bands are secured to a drum by nails driven through apertures therein: and Figure 4 is a longitudinal sectional view on an enlarged scale, showing a portion of a saw cylinder provided with my improved saw bands.

Referring now to the drawings, the numeral 1 indicates a drum consisting of circularly-arranged, longitudinally-disposed wooden bars to which is secured a surrounding casing or shell 3, the drum being provided with a central shaft 4, to which its ends are secured in the conventional manner. Surrounding the surface of the drum at regular intervals is a series of saw bands 5, which are secured to the drum by means, preferably, of nails 6, driven through apertures 7 in the saw bands.

Each of the saw bands 5 is turned outward at right angles to form flanges 8, (Fig. 4), which are provided with saw teeth 9.

According to my invention, the body of each saw band, or that part of the band lying between the flanges 8, and containing the apertures 7, is concaved or curved outward longitudinally as indicated at 10, in Figure 4, so that when the nails 6 are driven through the centrally-disposed apertures 7 and the shell 3 into the wooden bars 2, in the manner illustrated in the Figures 2 and 4, the edge portions of the bands lying directly under the flanges 8 will be forced firmly against the surface of the drum, and the natural spring of the metal will operate to constantly exert a force tending to hold the edges of the saw bands against the surface of the drum. Hence, as heretofore stated, there is no tendency on the part of the edges of the saw bands to bend or curl upward, and the contact of the edges with the surface of the drum will be so firm as to prevent any material from gaining entrance between the bands and the drum.

It will be obvious, also, that with this improved construction, if the saw bands are secured to the surface of a drum which is truly cylindrical, the completely assembled saw cylinder will also be true. This is an important result of the invention, because it insures that all members cooperating with the saw cylinder in the cleaning of cotton, such as the kicker roll, doffer, reclaiming saw, and the like, will operate uniformly throughout the entire surface of the saw cylinder, while the latter being true and free from lodgement of foreign matter, will rotate in a balanced condition, greatly increasing the life and efficiency of the machine in which it is mounted.

I claim:

1. A saw band for the saw cylinders of cotton cleaning machines comprising a strip of metal having its side edge portions turned outward at right angles and provided with saw teeth, the body of the band between its side edges being concaved throughout its length on its underside.

2. A saw band for the saw cylinders of cotton cleaning machines comprising a strip of metal having right-angular flanges at its opposite sides provided with saw teeth, the body of the saw band between said flanges being concave on its underside throughout its length and provided with centrally-disposed spaced apertures.

In testimony whereof I have hereunto set my hand.

ORVILLE MITCHELL.